UNITED STATES PATENT OFFICE.

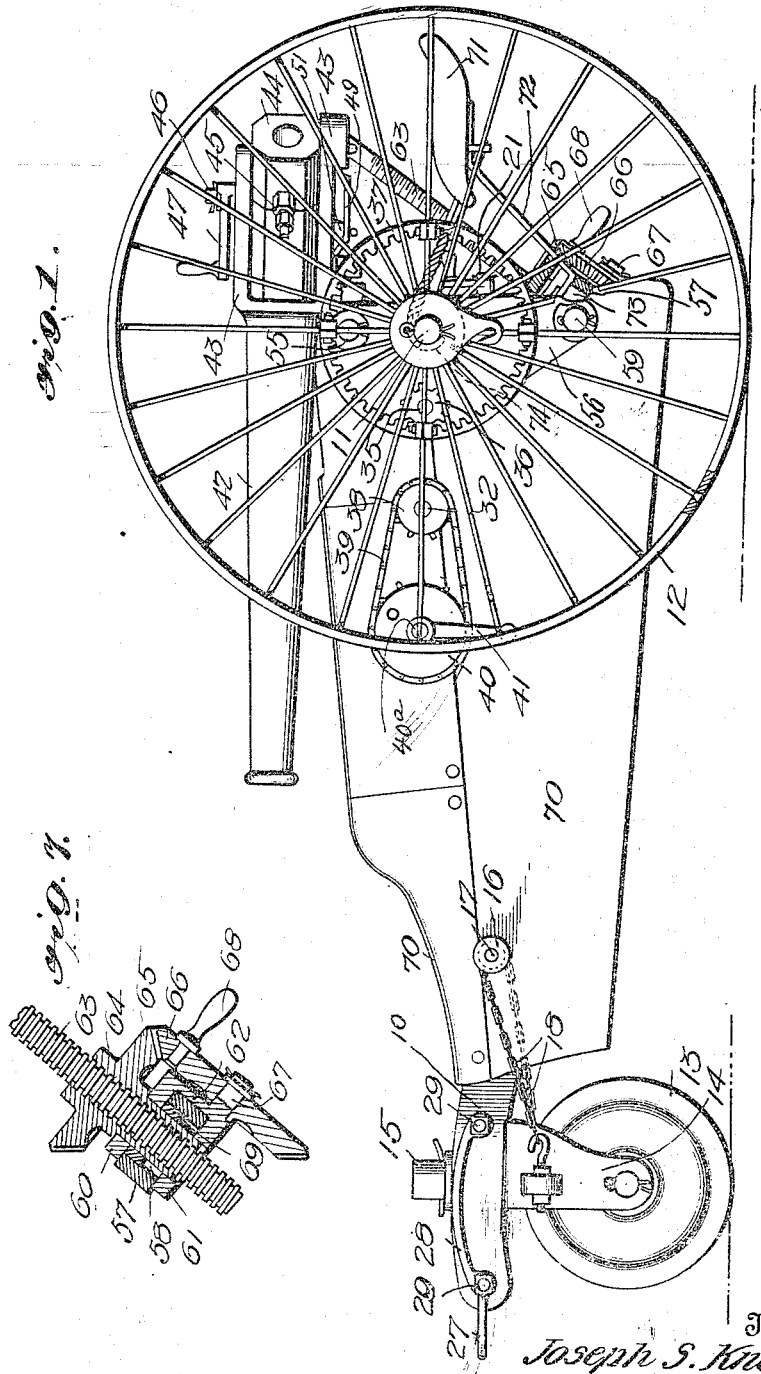

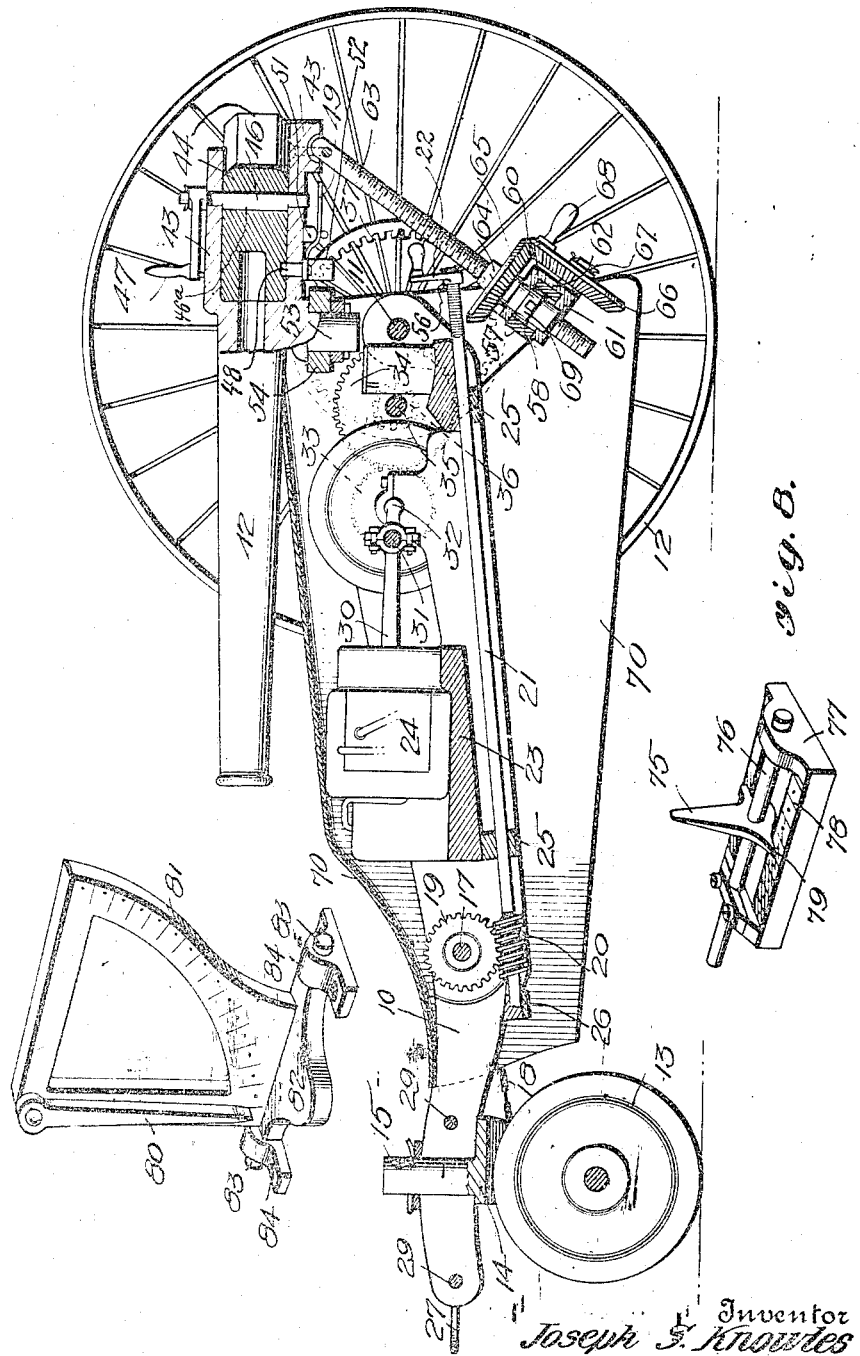

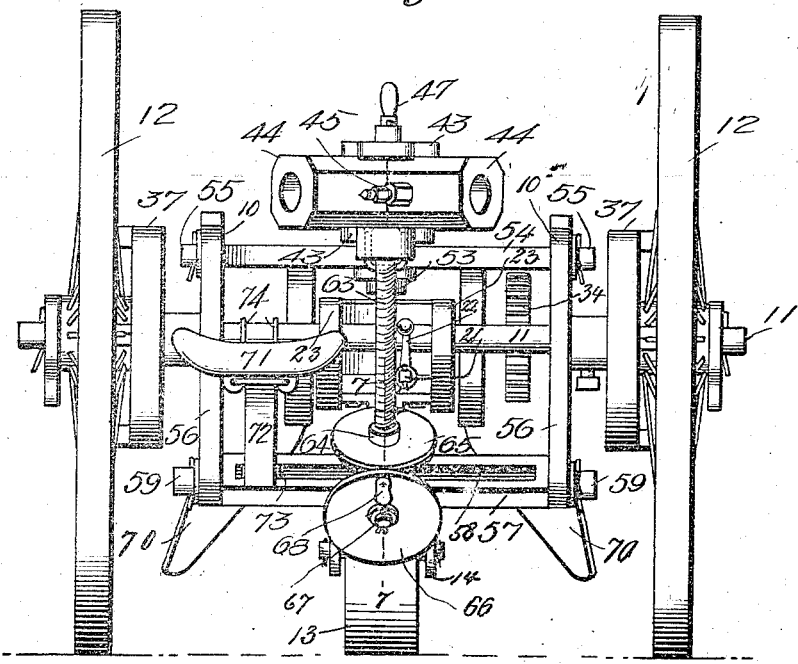

JOSEPH S. KNOWLES, OF ATLANTA, ILLINOIS.

ORDNANCE.

1,169,166. Specification of Letters Patent. Patented Jan. 25, 1916.

Application filed August 14, 1915. Serial No. 45,500.

*To all whom it may concern:*

Be it known that I, JOSEPH S. KNOWLES, a citizen of the United States, residing at Atlanta, in the county of Logan and State of Illinois, have invented certain new and useful Improvements in Ordnance, of which the following is a specification.

The gun which is the subject-matter of the present application for patent is designed for ordinary field service and also for firing on aerial craft, and the object of the invention is to provide a novel and improved mount for the gun which enables it to be easily transported, and rapidly operated.

In order that the invention may be better understood, reference is had to the accompanying drawings, in which—

Figure 1 is a side elevation of the gun with parts broken away; Fig. 2 is a central longitudinal section of the gun; Fig. 3 is a rear end view; Fig. 4 is a plan view of the breech end of the gun barrel; Fig. 5 is an enlarged section on the line 5—5 of Fig. 4; Fig. 6 is a cross-section on the line 6—6 of Fig. 5; Fig. 7 is a sectional detail on the line 7—7 of Fig. 3; Fig. 8 is a perspective view of an adjustable sight, and Fig. 9 is a perspective view of a range gage.

Referring specifically to the drawings, the gun is provided with a wheeled mount or carriage for transportation and field service. The mount is composed of substantial side pieces 10 spaced at their rear ends and supporting thereat a stationary axle 11 for two traction wheels 12, provided with roller bearings. The side pieces converge at their forward ends, and support a steering wheel 13 carried by a fork 14 having an upright stem 15 which is swiveled so that the wheel may be swung around to guide the carriage. A steering gear is provided, the same being composed of drums 16 on the ends of a transverse shaft 17 supported by the side pieces 10. On the drums are fastened and wound chains 18 which are connected to the sides of the fork 14. The chains are oppositely wound on the drums, and thus, when the shaft 17 is rotated one of the chains is paid out and the other chain is wound, and vice versa, whereby the wheel 13 is swung around in an obvious manner to guide the carriage. The shaft 17 is operated by a worm gearing, there being a worm wheel 19 fast on said shaft and meshing with a worm 20 on a shaft 21 extending rearward and having at its rear end a crank handle 22 for convenient operation.

The side pieces 10 and the axle 11 support a base 23 on which is mounted an engine 24 for propelling the carriage. The forward end of the base is supported by the side pieces and its rear end is hung on the axle 11. The base also has bearings 25 supporting the shaft 21 and the forward end of said shaft is provided with a thrust bearing 26 carried by the side pieces.

The engine 24 may be an ordinary internal-combustion engine, a detailed description of which is unnecessary. Suitable fuel and water tanks and other accessories will be provided, the same being mounted on the base 23.

To the forward end of the carriage is attached a clevis 27 for attachment of a team or for hitching the carriage behind a caisson in an emergency. The forward end of the carriage also has hand grips 28 on both sides to facilitate shifting or lifting the same. The bolts 29 securing the hand grip pass through the side pieces and firmly fasten the same together at their front ends.

The following drive gear is provided: The piston rod 30 of the engine 24 is connected to a crank 31 on a shaft 32 supported by bearings on the base 23. The shaft 32 has a pinion 33 which meshes with a spur gear 34 on a countershaft 35 supported by the side pieces. On the countershaft 35 are pinions 36 which are in mesh with internal gears 37 fastened to the wheels 12. The engine shaft 32 will be provided with a clutch or other controlling device, and on one end of said shaft is a sprocket wheel 38 connected by a chain 39 to a sprocket wheel 40 on a starting shaft 40ª provided with a detachable crank handle 41, said starting shaft being supported by one of the side pieces 10, and located so as to be readily accessible for starting the engine. The end of the crank shaft carrying the sprocket wheel 38 passes through the adjacent side piece 10.

At 42 is shown the barrel of the gun. The breech end of the barrel has spaced top and bottom walls 43 between which is pivotally mounted a series of short barrels 44 radiating from a common center and cast in one piece. The bores of the barrels 44 receive the projectiles, and they open through the outer ends of the barrels, and are closed at their inner ends, so as to serve as a breech closure for the main barrel 42 also. The barrels 44 are designed to be brought successively into alinement with the main barrel 42. The gun can therefore be quickly loaded and fired. After one of the barrels 44 has been brought into alinement with the main barrel 42, and the gun is fired, said barrel 44 is swung laterally to bring the next barrel into alinement with the main barrel. The bores of the barrels 44 which are not in alinement with the main barrel are free and unobstructed at their outer ends, so that the projectile can be quickly inserted. An electric firing device 45 is provided for each barrel 44.

Through the walls 43 and the center of the series of barrels 44 passes a vertical shaft or pin 46 on which said barrels are pivotally mounted. That portion of the shaft which passes through the barrels has a lateral eccentric or cam portion 46ª whereby, when the shaft is turned, which is done by a crank handle 47 fastened to its upper end, each barrel as it is swung to firing position, is forced forward and pressed firmly against the rear end of the main barrel 42.

The bottom wall 43 carries a spring latch 48 for locking the barrels 44 in firing position. The latch is retracted to release the barrels by a lever 49 loosely mounted on a pin 50 carried by a block 51 mounted on the wall 43. The lever is free to swing on the pin, and it rocks on the block, the latter serving as a fulcrum. The latch is guided by a yoke 52 carried by the wall 43.

The following means are provided for pointing the gun: On the bottom of the barrel 42, at the rear end thereof, is a depending pivot stud 53 which is journaled in a transverse supporting member 54 having trunnions 55 at its ends. The side pieces 10 have openings in which the trunnions are journaled. The supporting member is horizontal, and by its trunnion support it is mounted so that it may be rocked about a horizontal axis, and as it carries the barrel 42, the latter may be tilted to any intermediate position from the horizontal to a nearly vertical position. The barrel may be elevated to a high angle, in view of which the gun is especially adapted for firing at aerial craft. The pivot stud 53 also allows the barrel to be swung sidewise to obtain a large horizontal range.

At the axle 11, the side pieces 10 have downward extensions 56 which support a cross bar 57 having a longitudinal slot 58. The cross bar has trunnions 59 at its ends whereby it is pivotally mounted between the parts 56, the latter having apertures in which the trunnions are journaled. The cross bar is below and parallel to the supporting member 54.

On the cross bar 57 is mounted a slide composed of a top 60, a bottom 61 and a side 62. The top and bottom parts engage corresponding parts of the cross bar. In line with the slot 58, the top and bottom parts of the slide have apertures through which passes an elevating screw 63 swivelingly connected at its upper end to the rear end of the bottom wall 43. On this screw is threaded a non-traveling nut 64 having a bevel gear 65 which is in mesh with a bevel gear 66 journaled on a stud 67 carried by the side portion 62 of the slide. The bevel gear 66 is provided with a hand crank 68 whereby it is adapted to be turned to elevate or lower the barrel 42. Upon turning the bevel gear 66, the nut 64 is turned on the screw 63 through the bevel gear 65, and said screw is caused to travel in the direction of its length in an obvious manner. The slide and the tilting cross bar on which the slide is mounted allow the barrel to be swung sidewise at the same time it is elevated to the desired angle. A collar 69 on the hub of the gear 65 engaging the under side of the part 60 prevents the nut 64 from traveling on the screw.

The handle 22 is slidable on the squared rear end of the shaft 21 so that it may be slid out of the way of the pointing mechanism.

The carriage is provided with a suitable shield 70, which is in sections so that it may be readily applied or removed.

A seat 71 for the operator is mounted on a stem 72 fixed at its lower end to a block 73 seating in the slot 58. The seat is held in place by hooks 74 carried thereby, and engageable over the axle 11.

Fig. 8 shows a laterally adjustable sight 75 slidably mounted on a rod 76 carried by a supporting frame 77 having on one side a scale 78 on which indicates a pointer 79 projecting sidewise from the sight. The lateral adjustment of the sight is for the purpose of compensating for the effect of wind on the course of the projectile.

Fig. 9 shows a range gage composed of a pivoted pointer 80 indicating on a graduated arc 81 carried by a base 82 pivotally supported by trunnions 83 at its ends journaled in bearings 84, which permits the device to be folded flat when not in use.

I claim:

1. In a gun, the combination of the barrel, a vertically tiltable support to which the barrel is pivoted to swing laterally, an elevating screw for the barrel, a non-traveling nut on the screw, operating means for the nut, a slide carrying the nut and the operating means, and a tiltable support for the slide parallel to the barrel support.

2. In a gun, the combination of the barrel, a vertically tiltable support to which the barrel is pivoted to swing laterally, an elevating screw for the barrel, a non-traveling nut on the screw, a gear on the nut, a slide carrying the nut, a gear carried by the slide and meshing with the first-mentioned gear, and a tiltable support for the slide parallel to the barrel support.

3. In a gun, the combination of the barrel, a vertically tiltable support to which the barrel is pivoted to swing laterally, a tiltable cross-bar parallel to the support and having a longitudinal slot, a slide mounted on the cross-bar and having spaced parts straddling the cross-bar and apertures in line with the slot, an elevating screw connected to the barrel and passing through the apertures and the slot, a non-traveling nut on the screw, said nut having a gear, and an actuating gear on the slide and in mesh with the first-mentioned gear.

In testimony whereof I affix my signature in the presence of two witnesses.

JOSEPH S. KNOWLES.

Witnesses:
R. F. QUISUNBERRY,
W. C. TURNER.